United States Patent
Doemen et al.

(10) Patent No.: US 7,109,615 B2
(45) Date of Patent: Sep. 19, 2006

(54) ELECTRONICALLY COMMUTATED INTERNAL ROTOR MOTOR

(75) Inventors: Benno Doemen, St. Georgen (DE); Matthias Nickel-Jetter, Villingen-Schwenningen (DE)

(73) Assignee: ebm-papst St. Georgen GmbH & Co., KG, St. Georgen (DE)

( * ) Notice: Subject to any disclaimer, the term of this patent is extended or adjusted under 35 U.S.C. 154(b) by 73 days.

(21) Appl. No.: 10/493,329

(22) PCT Filed: Jan. 14, 2003

(86) PCT No.: PCT/EP03/00249

§ 371 (c)(1),
(2), (4) Date: Apr. 21, 2004

(87) PCT Pub. No.: WO03/069765

PCT Pub. Date: Aug. 21, 2003

(65) Prior Publication Data

US 2004/0245876 A1    Dec. 9, 2004

(30) Foreign Application Priority Data

Feb. 18, 2002  (DE) .............................. 202 02 523

(51) Int. Cl.
*H02K 11/00* (2006.01)
(52) U.S. Cl. ..................................... 310/68 B; 310/90
(58) Field of Classification Search ............. 310/90, 310/67 R, 68 B
See application file for complete search history.

(56) References Cited

U.S. PATENT DOCUMENTS 2,718,193  A  * 9/1955  Zimsky ................. 417/423.12
4,236,426  A  * 12/1980  Meinke et al. ............. 192/30 R
4,355,255  A  10/1982  Herr et al. .................. 218/138

(Continued)

FOREIGN PATENT DOCUMENTS

DE    27 43 837    4/1979

(Continued)

OTHER PUBLICATIONS

Infineon Technologies, Munich, Germany, "Product Brief GMR-B6 & GMR-C6 Giant Magneto Resistor—the optimized angle sensor," © 2001, Ordering No. B112-H7829-X-X-7600, pp. 1-2; further details available at WWW.INFINEON.COM.

(Continued)

*Primary Examiner*—Dang Le
(74) *Attorney, Agent, or Firm*—Milton Oliver, Esq.; Ware Fressola Van Der Sluys & Adolphson LLP

(57) ABSTRACT

An electronically commutated internal rotor motor (20) has an outer stator (28) and a permanent magnet rotor (36) arranged rotatably therein by means of a shaft (40) supported at its drive end (42) by a rotary bearing (54) located in the A-side bell (26) and supported at its other end (44) by a rotary bearing (72) located in the B-side bell (66). The rotary bearing (54) in the A-side bell is preferably so configured that it permits a small radial movement (56) of the drive end (42) relative to this bell (26). The rotary bearing (72) in the B-side bell (66) has its outer race (72) tensioned against a shoulder (90, 94). Its inner race (74) is tensioned between a shoulder (78) of the shaft (40) and a shaped part of non-ferromagnetic material. This shaped part is pressed by a countersunk screw (82), screwed into a threaded bore (84) of the other shaft end (44), against the inner race.

15 Claims, 2 Drawing Sheets

U.S. PATENT DOCUMENTS

| | | | | |
|---|---|---|---|---|
| 4,875,785 A | | 10/1989 | Santos et al. | 384/448 |
| 4,978,234 A | | 12/1990 | Ouchi | 384/448 |
| 4,982,125 A | | 1/1991 | Shirakawa | 310/88 |
| 5,687,016 A | * | 11/1997 | Seto | 359/200 |
| 6,011,388 A | | 1/2000 | Miyazaki et al. | 324/174 |
| 6,107,704 A | * | 8/2000 | Wallner et al. | 310/40 MM |
| 6,796,888 B1 | * | 9/2004 | Jasch | 451/342 |

FOREIGN PATENT DOCUMENTS

| | | |
|---|---|---|
| DE | 197 12 588 | 10/1997 |
| FR | 2 497 571 | 7/1982 |
| FR | 2 646 028 | 10/1990 |

OTHER PUBLICATIONS

Thomson Derwent English abstract of DE 27 43 837, Kristen et al./Siemens, Apr. 21, 2004.

Thomson Derwent English abstract of FR 2 497 571, Advolotkin et al., Apr. 21, 2004.

Thomson Derwent English abstract of FR 2 646 028, Galko, Apr. 21, 2004.

Thomson Derwent English abstract of DE 197 12 588, Winkelströter et al., Apr. 21, 2004.

* cited by examiner

ELECTRONICALLY COMMUTATED INTERNAL ROTOR MOTOR

CROSS-REFERENCE

This application is a section 371 of International Application PCT/EP03/00249, filed 14 Jan. 2003 and published in German as WO 03-069765-A1 on 21 Aug. 2003. The priority of German application DE 202 02 523.3 of 18 Feb. 2002 is claimed in the International Application.

FIELD OF THE INVENTION

The invention relates to an electronically commutated internal rotor motor. Such motors have a low axial moment of inertia ($GD^2$) and are primarily used in situations where a high rotational acceleration of the rotor is required.

SUMMARY OF THE INVENTION

It is an object of the invention to provide a new electronically commutated internal rotor motor. In accordance with the invention, this object is achieved by supporting the ends of the rotor shaft in bearings in an A-side bell and in a B-side bell, respectively, and providing a tensioning element for the bearing in the B-side bell. One thereby obtains a robust motor, which enables, even at high accelerations, quiet running of the motor and associated gears, and which is particularly adapted for drives with high RPM which, during operation, are subject to loading by impacts and the like.

A preferred refinement of the invention is to mount a control magnet, for triggering commutation of the motor, in a recess of a shaped part, of non-ferromagnetic material, located at one shaft end. This makes it possible to so arrange a control magnet, that its magnetic field is not influenced or only minimally negatively influenced by the shaped part and by the countersunk screw, so that exact commutation of the currents in the motor can be carried out by means of such a control magnet.

Further details and advantageous refinements of the invention will be apparent from the embodiment described in the following description and drawings, which is not to be understood as a limitation of the invention.

BRIEF FIGURE DESCRIPTION

Figure 1:
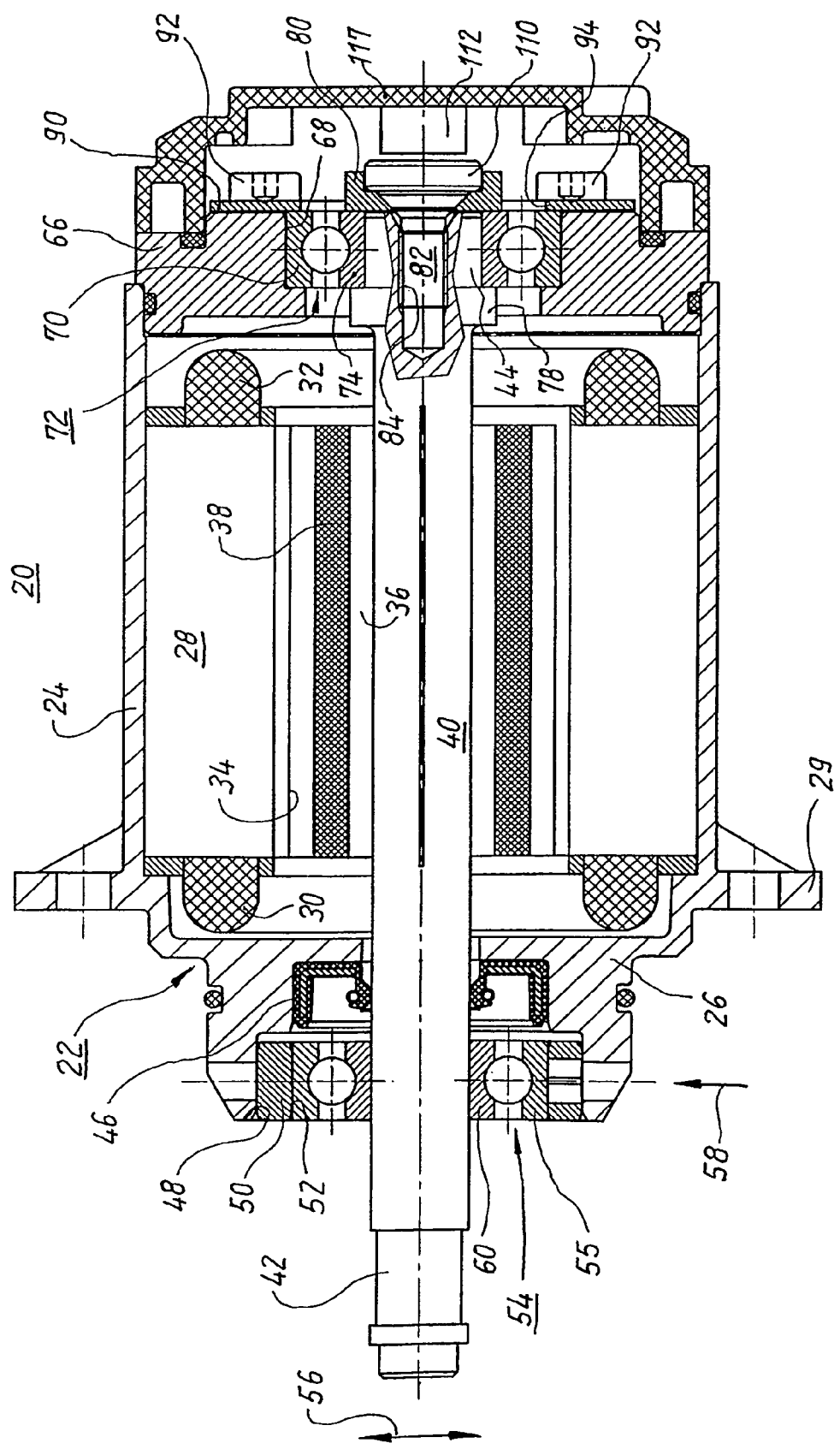
Figure 2:
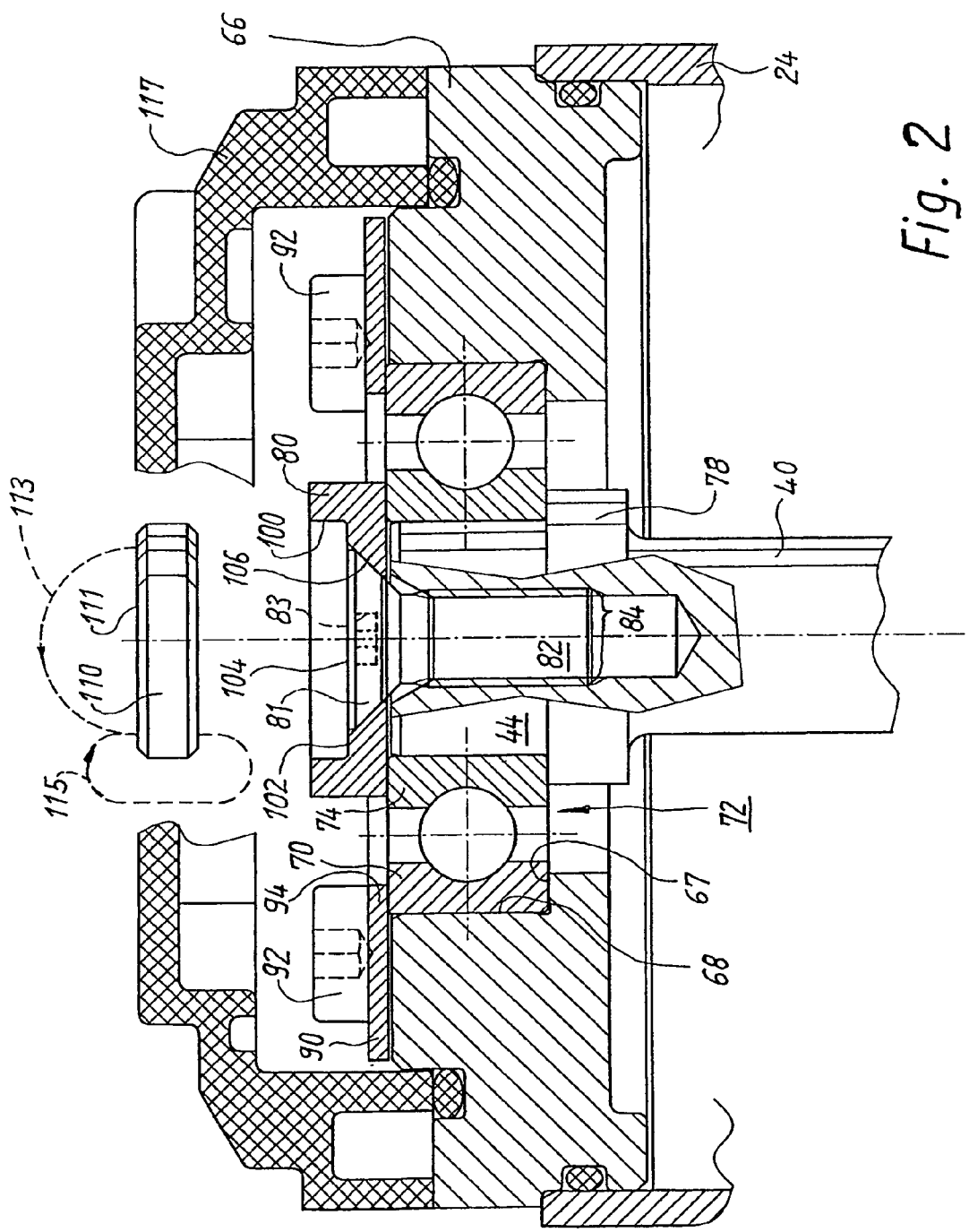

FIG. 1 is a longitudinal section through a preferred embodiment of a motor according to the invention; and FIG. 2 is an enlarged view of a portion of FIG. 1, with components separated.

DETAILED DESCRIPTION

FIG. 1 illustrates an electronically commutated internal rotor motor 20 with a housing 22 having a cylindrical housing part 24, an A-side bell 26, and a mounting flange 29.

Inside cylindrical housing part 24 is arranged the lamination stack of an outer stator 28, whose winding heads are designated 30 and 32. Stator 28 has an internal recess 34, in which a rotor 36, with permanent magnets 38 on a shaft 40, is arranged. Its drive end is designated 42 and its inner shaft end is designated 44. Such a motor can also be called a "permanently excited synchronous internal rotor machine."

In the A-side bell 26, a seal 46 for the shaft 40 is provided, in the usual manner. Also located there is a recess 48 in which is secured a guide ring 50, which receives in a slot-like recess, with slight-radial play, the outer race 55 of a rotary bearing 54. This radial play is indicated at 56. In other words, rotary bearing 54 permits a slight radial movement of drive end 42 relative to A-side bell 26. For this purpose, the outer race 55 is subjected to a radial force in the direction of arrow 58 by a spring, not shown. The radial movability generally approximates a fraction of a millimeter, e.g. 0.4 mm, and serves to keep the play in a spiral or worm drive, driven by shaft 40, as small as possible. Particularly at high speeds exceeding 10,000 RPM, a preferred field of application for such motors, noise minimization in a drive system driven by the motor is very important. The inner race 60 of rotary bearing 54 is pressed onto the shaft 40.

In the open end of cylindrical housing part 24, a B-side bell 66 is secured. This is formed with a recess 68, having an annular shoulder 67 (FIG. 2) to receive the outer race 70 of a rotary bearing 72 which permits a slight cardanic movement of the right, inner shaft end 44, the inner race 74 of the bearing being secured on this end 44. For this purpose, shaft 40 has an annular flange 78, with whose right shoulder the shaft abuts against the left side of inner race 74. Against the right side rests a shaped part 80, which is essentially annular and is urged by the countersunk head 81 of a countersunk screw 82 in the direction of shaft 40. Screw 82 is screwed into an internal thread 84 in shaft end 44, and thereby urges shaped part 80 in the direction of shaft end 44.

For assured holding-in of outer race 70, there is provided a flat, washer-shaped part or tensioning element 90 which is secured by its outer periphery onto bell 66 by a plurality of screws 92, preferably three evenly distributed screws. A radially inner portion 94 of part 90 engages against outer race 70 and urges it leftward against shoulder 67, recess 68 being somewhat narrower than outer race 70.

Screw 82 is here a countersunk screw with an inner hexagonal recess 83. Shaped part 80 is composed of a non-ferromagnetic material, preferably brass. It has a cylindrical recess 100, whose bottom is designated 102 and is either flush with the upper surface 104 of countersunk screw 82, shown in FIG. 2, or slightly higher than this. As shown, shaped part 80 is formed with a recess 106 complementary to head 81, so that a compact structure results.

After shaped part 80 is secured with screw 82 onto shaft end 44, a control magnet 110 is secured in cylindrical recess 100, e.g. by gluing. FIG. 2 show the control magnet before the securing, while FIG. 1 shows it afterward. Control magnet 110 is provided, on the upper surface 111 shown in FIG. 2, with a magnetization pattern. In FIG. 2, its useful flux 113 is designated 113, while its stray flux is designated 115. Useful flux 113 serves for control of magnetoresistive resistors 112, which are arranged on a housing cover 117 on the B-side of motor 22, as shown schematically in FIG. 1. They serve for detection of the rotational position of rotor 36, in order to exactly control the commutation of the currents in stator 28. Commutation by means of such rotational position sensors 112 controlled by a control magnet 110 is known, in many variations, to those skilled in the art, and therefore requires no further explanation. Sensor 112 is preferably arranged in a space defined as a theoretical axial geometric projection of the control-magnet-adjacent end of shaft 40. Preferably, the magnetization pattern on side 111 of control magnet 110 is first created, after control magnet 110 is secured in the recess 100, and this preferably occurs simultaneously with the magnetization of the permanent magnets 38 of rotor 36.

The fact, that shaped part 80 is made of a non-ferromagnetic material, means that it causes no significant attenuation of control magnet 110, so that, even with a small control magnet 110, one obtains a sufficiently strong useful flux 113. The use of magnetoresistive resistors 112 is advantageous in this design, since such resistors are even controllable by magnetic fields 113 which run transverse to the resistors 112. This structure is thus particularly well adapted for high-RPM motors and is also insensitive to axial impacts which, during operation, could exert their influence upon shaft 40. However, the use of other kinds of rotor position sensors is not excluded, e.g. Hall sensors or optical sensors.

The construction with the shaped part 80 and with the countersunk screw 82 has proven to be advantageous, since one can use a screw 82 of ferromagnetic material, which in this case performs as a part of the magnetic circuit of control magnet 110 and strengthens its useful flux 113. The use of a screw head 81 with internal hexagon 83 is advantageous because the head forms a part of the magnetic circuit, and a symmetrical form of the magnetic circuit for the control magnet 110 so thereby a very exact commutation of the currents in stator 28 results, which, particularly at high RPM, is very important in order to obtain a maximal motor power.

Naturally, many variations and modifications are possible, within the scope of the present invention.

The invention claimed is:

1. An electronically commutated motor (20), comprising:
    an external stator (28);
    an A-side bell (26) provided on a drive side of the motor (20);
    a B-side bell (66) on an opposing side of the motor (20);
    a permanent magnet rotor (36) rotatably arranged in the external stator (28);
    a shaft (40) associated with the permanent magnet rotor (36) provided with a shoulder (78) and supported at its drive end (42) by a rotary bearing (54) in said A-side bell (26) and supported at a second shaft end (44) by a rotary bearing (72) arranged in said B-side bell (66);
    a tensioning element (90, 94) secured to said B-side bell (66), tensioning an outer race (70) of the rotary bearing (72) there between said tensioning element and a shoulder (67) of the B-side bell (66);
    a shaped part (80) composed of non-ferromagnetic material and provided with a recess (100, 102);
    a control magnet (110), arranged in said recess (100,102), for controlling commutation of said motor;
    a countersunk screw (82) screwed into an internal thread (84) of the other shaft end (44) which screw, via the shaped part, presses the inner race (74) of the rotary bearing located in the B-side bell (66) against a shoulder (78) of the shaft (40).

2. The motor according to claim 1, wherein
    the rotary bearing (54) in the A-side bell (26) is configured to permit a slight radial movement of said drive end (42) of said shaft (40), relative to said A-side bell (26).

3. The motor according to claim 2, wherein the rotary bearing (72) arranged in the B-side bell (66) is so formed that it permits a cardanic movement of the shaft (40) supported in the bearing.

4. The motor according to claim 2,
    wherein the outer race (70) of the rotary bearing (72) in said B-side bell (66) is somewhat longer than a recess (68) which receives said outer race, and wherein
    a tensioning element in the B-side bell (66) is formed as an essentially flat metal part which engages with its inner periphery (94) against said outer race (70) and which, in a region of its external periphery, is secured with screws (92) to the B-side bell (66).

5. The motor according to claim 1, wherein,
    in a space defined as a theoretical axial geometric projection of the shaft end opposite the control magnet (110), a galvanomagnetic sensor (112) is arranged, along with at least one magnetoresistive resistor controllable by a magnetic field (113) of the control magnet (110).

6. The motor according to claim 5, wherein the rotary bearing (72) arranged in the B-side bell (66) is so formed that it permits a cardanic movement of the shaft (40) supported in the bearing.

7. The motor according to claim 5,
    wherein the outer race (70) of the rotary bearing (72) in said B-side bell (66) is somewhat longer than a recess (68) which receives said outer race, and wherein
    a tensioning element in the B-side bell (66) is formed as an essentially flat metal part which engages with its inner periphery (94) against said outer race (70) and which, in a region of its external periphery, is secured with screws (92) to the B-side bell (66).

8. The motor according to claim 1,
    wherein the outer race (70) of the rotary bearing (72) in said B-side bell (66) is somewhat longer than a recess (68) which receives said outer race, and wherein
    a tensioning element in the B-side bell (66) is formed as an essentially flat metal part which engages with its inner periphery (94) against said outer race (70) and which, in a region of its external periphery, is secured with screws (92) to the B-side bell (66).

9. The motor according to claim 8, wherein the rotary bearing (72) arranged in the B-side bell (66) is so formed that it permits a cardanic movement of the shaft (40) supported in the bearing.

10. The motor according to claim 1, wherein the rotary bearing (72) arranged in the B-side bell (66) is so formed that it permits a cardanic movement of the shaft (40) supported in the bearing.

11. The motor according to claim 1, wherein
    a head (81) of the countersunk screw (82) is provided with an internal hexagon (83) for its actuation.

12. The motor according to claim 11, wherein
    the head (81) of the countersunk screw (82) forms a part of the magnetic circuit of the control magnet (110).

13. The motor according to claim 12, wherein the rotary bearing (72) arranged in the B-side bell (66) is so formed that it permits a cardanic movement of the shaft (40) supported in the bearing.

14. The motor according to claim 12,
    wherein the outer race (70) of the rotary bearing (72) in said B-side bell (66) is somewhat longer than a recess (68) which receives said outer race, and wherein
    a tensioning element in the B-side bell (66) is formed as an essentially flat metal part which engages with its inner periphery (94) against said outer race (70) and which, in a region of its external periphery, is secured with screws (92) to the B-side bell (66).

15. The motor according to claim 11, wherein
    the head (81) of the countersunk screw (82) forms a part of the magnetic circuit of the control magnet (110).

* * * * *